United States Patent
Harada

(10) Patent No.: US 7,737,602 B2
(45) Date of Patent: Jun. 15, 2010

(54) ROTATING ELECTRICAL MACHINE OR ALTERNATOR AND METHOD OF MANUFACTURING ROTOR CORE USED IN THE SAME

(75) Inventor: Koji Harada, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/634,977

(22) Filed: Dec. 7, 2006

(65) Prior Publication Data

US 2007/0132337 A1    Jun. 14, 2007

(30) Foreign Application Priority Data

Dec. 9, 2005    (JP)    ............... 2005-355533

(51) Int. Cl.
  *H02K 1/22*    (2006.01)
(52) U.S. Cl. .................. 310/263; 310/216.001; 310/156.74; 310/156.66; 310/156.69; 310/156.73; 310/156.71
(58) Field of Classification Search .......... 310/216, 310/217, 218, 261, 263, 156.66, 56.69, 156.731, 310/156.69, 156.73, 257, 259, 156.71, 156.74; *H02K 1/22*
  See application file for complete search history.

(56) References Cited

U.S. PATENT DOCUMENTS

| | | | | |
|---|---|---|---|---|
| 2,795,715 A * | 6/1957 | Gilchrist | ...................... | 310/263 |
| 3,242,364 A * | 3/1966 | Johnson | ...................... | 310/263 |
| 3,529,856 A * | 9/1970 | Smith et al. | .................. | 285/343 |
| 3,614,593 A * | 10/1971 | Lace | ........................... | 322/28 |
| 4,099,323 A * | 7/1978 | Bouvier | ....................... | 29/882 |
| 4,228,377 A * | 10/1980 | Kreuzer | ....................... | 310/263 |
| 4,339,873 A * | 7/1982 | Kanamaru et al. | ............ | 29/598 |
| 4,377,762 A * | 3/1983 | Tatsumi et al. | ................ | 310/42 |
| 4,623,812 A * | 11/1986 | van de Griend | ............. | 310/268 |
| 4,703,987 A * | 11/1987 | Gallusser et al. | ............ | 439/595 |
| 4,746,240 A * | 5/1988 | Tarum et al. | ................ | 403/282 |
| 5,177,391 A * | 1/1993 | Kusase | ....................... | 310/263 |
| 5,457,588 A * | 10/1995 | Hattori et al. | ............ | 360/99.08 |
| 6,144,138 A * | 11/2000 | Ragaly | ....................... | 310/263 |
| 6,501,617 B1 * | 12/2002 | Harada et al. | ............ | 360/99.08 |
| 2002/0011757 A1 * | 1/2002 | Tanaka et al. | ............... | 310/263 |
| 2004/0071504 A1 | 4/2004 | Harada | | |
| 2005/0127766 A1 * | 6/2005 | Ernest | ........................ | 310/105 |

FOREIGN PATENT DOCUMENTS

| | | |
|---|---|---|
| CN | 1497574 A | 5/2004 |
| JP | 61-979 B2 | 1/1986 |

* cited by examiner

*Primary Examiner*—Quyen Leung
*Assistant Examiner*—John K Kim
(74) *Attorney, Agent, or Firm*—Crowell & Moring LLP

(57) ABSTRACT

A rotor core which has relatively high rigidity, can ensure sufficient magnetic performance, and can be produced at a cheaper cost with a relatively small-scale facility. A claw-equipped core and a yoke are manufactured separately. After fitting the yoke to a fitting portion formed in the claw-equipped core, a part of the claw-equipped core in the vicinity of the fitting portion is axially pressed to plastically flow into an annular groove formed in the yoke, thereby integrally joining the claw-equipped core and the yoke to each other. Thus, a large-scaled manufacturing facility is not required, and claws of the claw-equipped core are hard to open in the radial direction even under the action of a centrifugal force during high-speed rotation. A stator core and the claws of the claw-equipped core can be positioned closer to each other, and deterioration of magnetic performance can be avoided.

2 Claims, 9 Drawing Sheets

ROTATING ELECTRICAL MACHINE OR ALTERNATOR AND METHOD OF MANUFACTURING ROTOR CORE USED IN THE SAME

BACKGROUND OF THE INVENTION

1. Field of the Invention

The present invention relates to a rotating electrical machine or an alternator and a method of manufacturing a rotor core used in the rotating electrical machine or the alternator.

2. Description of the Related Art

In a known alternator, plate-like rotor cores are disposed at opposite ends of a cylindrical yoke which is disposed in the inner peripheral side, and a plurality of claws are axially projected from outer peripheries of the rotor cores in alternately interdigitated relation. A shaft is inserted within the yoke. Further, because of the necessity of arranging a field coil between inner peripheries of the claws and an outer periphery of the yoke, the yoke is divided into a plurality of pieces and the divided yoke pieces are fixed to each other after arranging the field coil in place.

Patent Document 1 (JP-B-61-000979) discloses a rotor core structure in which claw-equipped cores and a yoke are constituted as separate parts, and these separates parts are individually fastened to a shaft to constitute an integral assembly for the purpose of avoiding a production facility from increasing in scale corresponding to an increase of the component size.

SUMMARY OF THE INVENTION

With the rotor core structure disclosed in Patent Document 1, however, because the claw-equipped cores and the yoke are held in contact with each other just by respective fastening forces to the shaft, rigidity is low and claws are apt to open in the radial direction with elastic deformation by the action of a centrifugal force during high-speed rotation. For that reason, an air gap has to be set to a larger value so that the claws will not contact with a stator core disposed around the claw-equipped cores. This leads to another problem that magnetic resistance is increased in a magnetic path extending from the claw-equipped cores to the stator core and efficiency is deteriorated.

An object of the present invention is to provide a rotating electrical machine or an alternator in which claws of a rotor core are hard to open in the radial direction even under the action of a centrifugal force during rotation and an air gap between the claws and a stator core can be reduced, and a method of manufacturing a rotor core used in the rotating electrical machine or the alternator.

To achieve the above object, the present invention is featured in that a yoke is joined to a claw-equipped core by plastic flow.

Also, the present invention is featured in that the claw-equipped core and the yoke are mechanically integrally joined to each other.

Further, the present invention is featured in comprising the steps of forming a fitting portion in the claw-equipped core, fitting the yoke to the fitting portion, and axially pressing a part of the claw-equipped core around the fitting portion to be plastically deformed, thereby joining the claw-equipped core and the yoke to each other.

According to the present invention, claws of the rotor core are hard to open in the radial direction even under the action of a centrifugal force during rotation and an air gap between the claws and a stator core can be reduced. As a result, magnetic performance can be ensured at a sufficient level.

DESCRIPTION OF THE PREFERRED EMBODIMENTS

Figure 1:
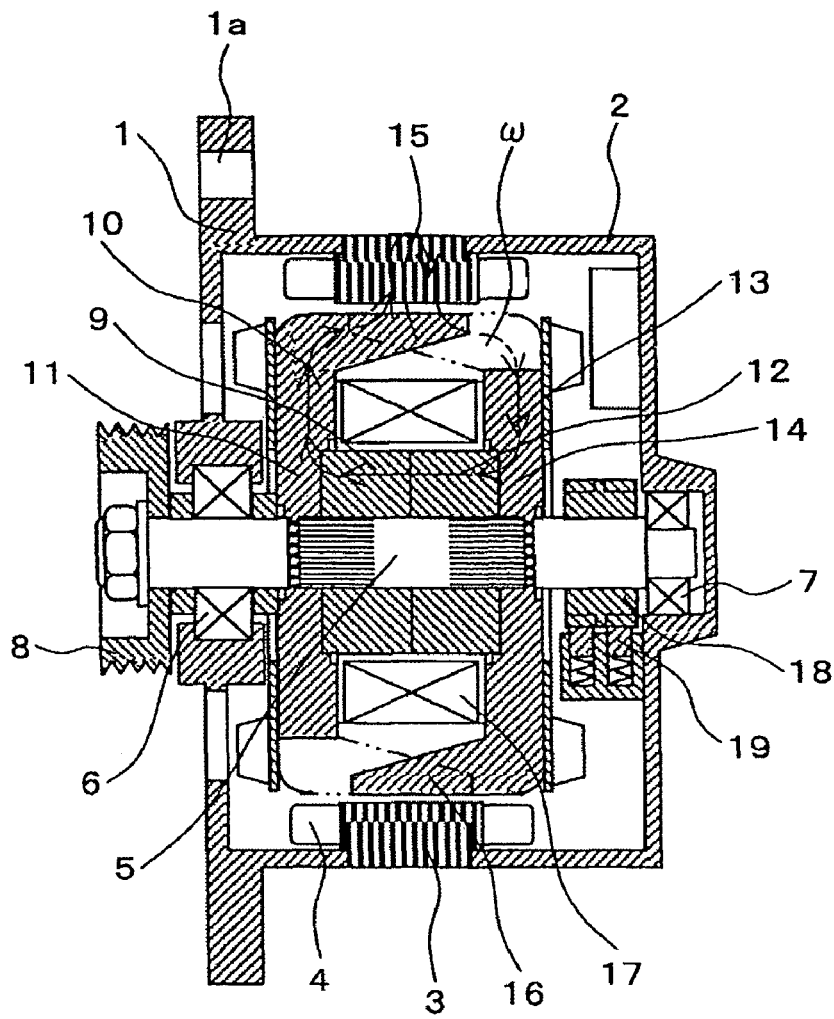
FIG. 1 is a longitudinal sectional view showing one example of a vehicular alternator using a rotor core according to the present invention.

One example of a vehicular alternator will be described below as a typical example of a rotating electrical machine according to one embodiment of the present invention. FIG. 1 is a longitudinal sectional view of the vehicular alternator.

A stator core 3 is held between a front housing 1 and a rear housing 2. The front housing 1, the rear housing 2, and the stator core 3 are fixed together by tightening screws and nuts (not shown) to apply a strong force in the direction in which the front housing 1 and the rear housing 2 grip the stator core 3 between them. The front housing 1 includes a flange 1a which is used to fix the alternator to a bracket provided on an engine block (not shown). The stator core 3 has a plurality of teeth formed along an entire inner periphery facing the rotor side, and stator coils 4 are wound over the teeth. Three-phase AC voltages are induced in the stator coils 4 with the rotation of magnetized rotor cores 11 and 14 (described later).

A rotary shaft 5 is rotatably supported by the front housing 1 and the rear housing 2 through a bearing 6 provided in the front housing 1 and a bearing 7 provided in the rear housing 2. A pulley 8 for receiving torque from a driving source, i.e., an engine, is fastened to an end of the rotary shaft 5 on the same side as the front housing 1 by screwing a nut. A rotor core 11 is made up of a hollow cylindrical yoke 9 and a claw-equipped core 10 having a plurality (six in the illustrated example) of claws 15, which are integrally projected from an outer peripheral portion of the core 10 so as to serve as magnetic poles, the yoke 12 and the claw-equipped core 10 being integrated with each other by the method according to the present invention. A rotor core 14 is made up of a yoke 12 and a claw-equipped core 13 which are integrated with each other similarly to the rotor core 11. The claw-equipped core 10 and the claw-equipped core 13 are fixed to a substantially central area of the rotary shaft 5 to be held in mutually fixed state. The claws 15 and 16 of the claw-equipped cores 10 and 13 are arranged in interdigitated relation. In addition, the rotor cores 11 and 14 are fixed to the rotary shaft 5 by causing parts of the yokes 9 and 12 to flow into respective annular grooves formed in the rotary shaft 5 by plastic flow. The rotary shaft 5 is made of an iron-based material, i.e., S45C, and the claw-equipped cores 10, 13 and the yokes 9, 12 of the rotor cores 11 and 14 are each made of a magnetic material, i.e., low carbon steel.

A field coil 17 is wound over the yokes 9 and 12 of the rotor cores 11 and 14. A slip ring 18 is fastened to an end of the rotary shaft 5 on the side nearer to the rear housing 2 and is supplied with a current from the exterior through a brush 19. When a current is supplied to the field coil 17 from the exterior, magnetic flux is generated in the rotor cores 11 and 14 and around the stator core 3 on the housing side, to thereby constitute a magnetic flux path as indicated by an arrow ω in FIG. 1. When torque is inputted to the rotary shaft 5 through the pulley 8 and the rotor cores 11 and 14 are rotated together with the rotary shaft 5 in the state of the magnetic flux path being thus formed, an AC electromotive force is induced in the stator coils 4.

The claw-equipped core 10 and the yoke 9 will be described in more detail below. The claw-equipped core 10 is desirably made of a material that is easily subjected to plastic working and has superior magnetic characteristics, i.e., low carbon steel in which the C content is 0.1% or less. The yoke 9 is also desirably made of a material that is easily subjected to plastic working and has superior magnetic characteristics, i.e., low carbon steel in which the C content is 0.1% or less.

Figure 5:
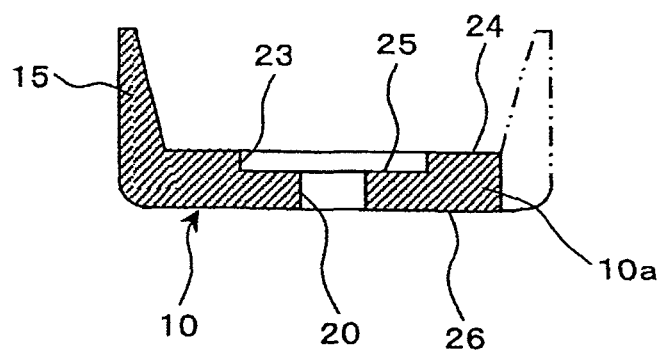
FIG. 5 is a longitudinal sectional view of a claw-equipped core alone according to the present invention.
Figure 6:
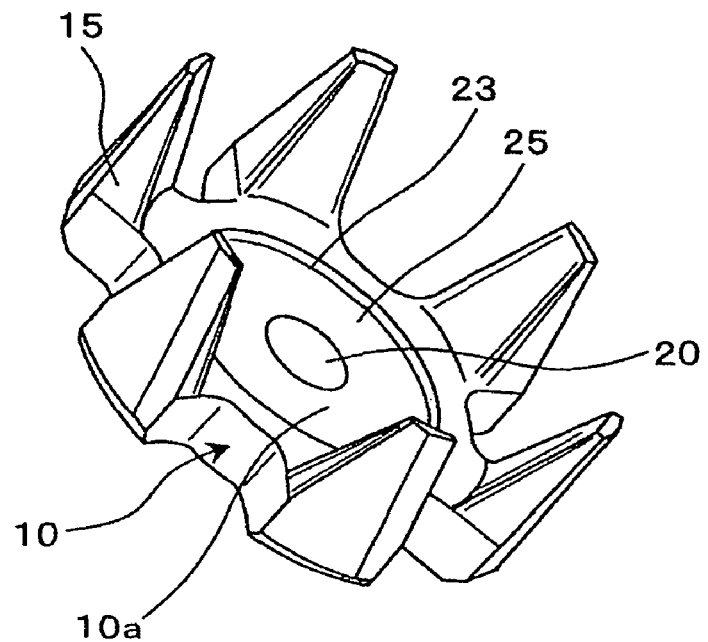
FIG. 6 is a perspective view of the claw-equipped core alone according to the present invention.

FIGS. 5 and 6 show one example of the claw-equipped core 10 according to the present invention. The claw-equipped core 10 has a base portion 10a substantially in the form of a starfish, and six claws 15 are projected from the base portion 10a in the axial direction of the rotary shaft 5 (i.e., the upward direction in FIG. 2) such that each claw 15 has a tapered shape. The claws 15 are not necessarily required to project exactly parallel to the rotary shaft 5, and the claws 15 may be inclined to some extent with respect to the rotary shaft 5 so long as they are projected substantially in the axial direction of the rotary shaft 5. A joining hole 23 in the form of a recessed hole is formed as a fitting portion substantially at a central position of one surface of the starfish-shaped base portion 10a on the side where the claws 15 are projected. The joining hole 23 has a diameter slightly larger than an outer diameter of the yoke 9. Further, a core center hole 20 through which is inserted the rotary shaft 5 is formed substantially at a central position of the bottom of the joining hole 23 so as to penetrate the starfish-shaped base portion 10a up to the opposite side. The core central hole 20 is also utilized as a positioning hole when the yoke 9 is plastically joined to the claw-equipped core 10.

Figure 4:
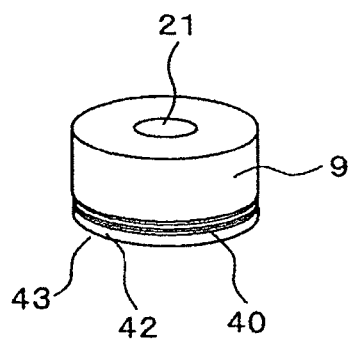
FIG. 4 is a perspective view of a yoke alone according to the present invention.
Figure 11:
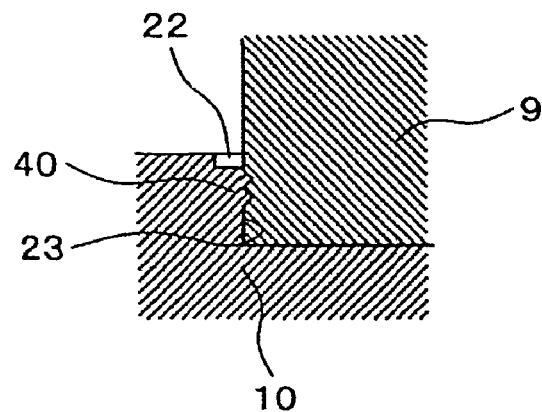
FIG. 11 is a partially enlarged longitudinal sectional view showing another example of the portions of the claw-equipped core and the yoke joined to each other according to the present invention.

FIG. 4 shows one example of the yoke 9 according to the present invention. The yoke 9 has a hollow cylindrical shape with a through-hole 21 formed at a center to penetrate thoroughly. The through-hole 21 is formed to be positioned in substantially continuous relation to the core central hole 20. Similarly to the roles of the core central hole 20, the through-hole 21 also receives the rotary shaft 5 and is utilized as a positioning hole when the yoke 9 is plastically joined to the claw-equipped core 10. Further, as shown in enlarged views of FIGS. 11 and 14, a plurality (two in the illustrated example) of grooves each having sloped surfaces in a cross-section as viewed in the axial direction, i.e., annular grooves 40 each having an almost triangular axial cross-section, are preferably formed in an outer diameter portion of the yoke 9 near one end thereof, which portion is to be joined to the claw-equipped core 10, thus providing substantially saw-toothed annular grooves 40.

Figure 2:
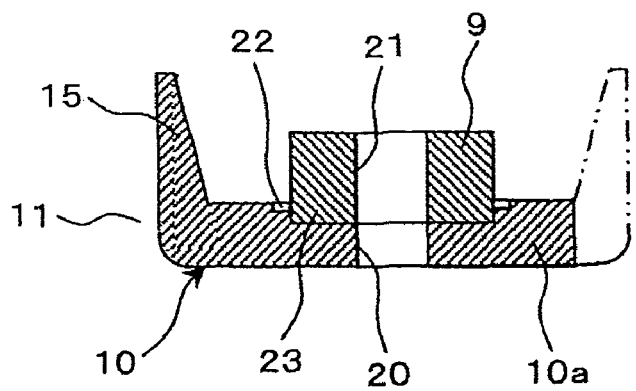
FIG. 2 is a longitudinal sectional view showing one example of the rotor core according to the present invention.
Figure 3:
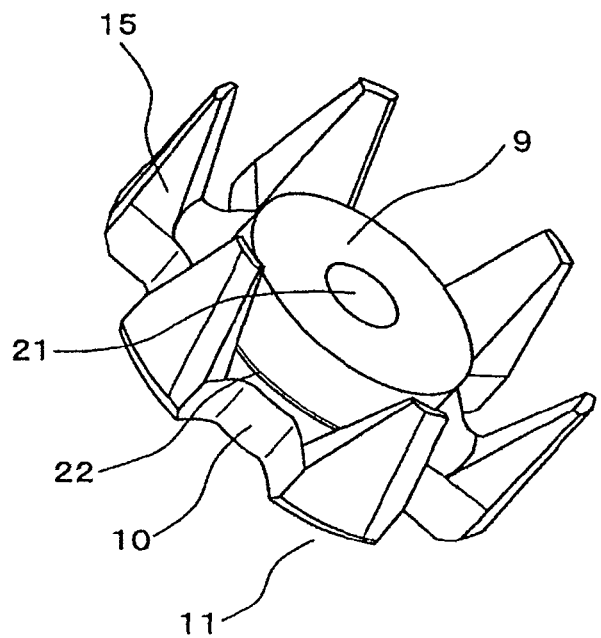
FIG. 3 is a perspective view of the rotor core according to the present invention.

FIGS. 2 and 3 show one example of the rotor core 11 made up of the claw-equipped core 10 and the yoke 9 according to the present invention. By fitting the end of the yoke 9 on the side where the annular grooves 40 are formed to the joining hole 23 of the claw-equipped core 10 and locally pressing an outer peripheral edge of the joining hole 23, the yoke 9 and the claw-equipped core 10 are plastically joined to each other while a pressing mark 22 is left as shown.

Figure 7:
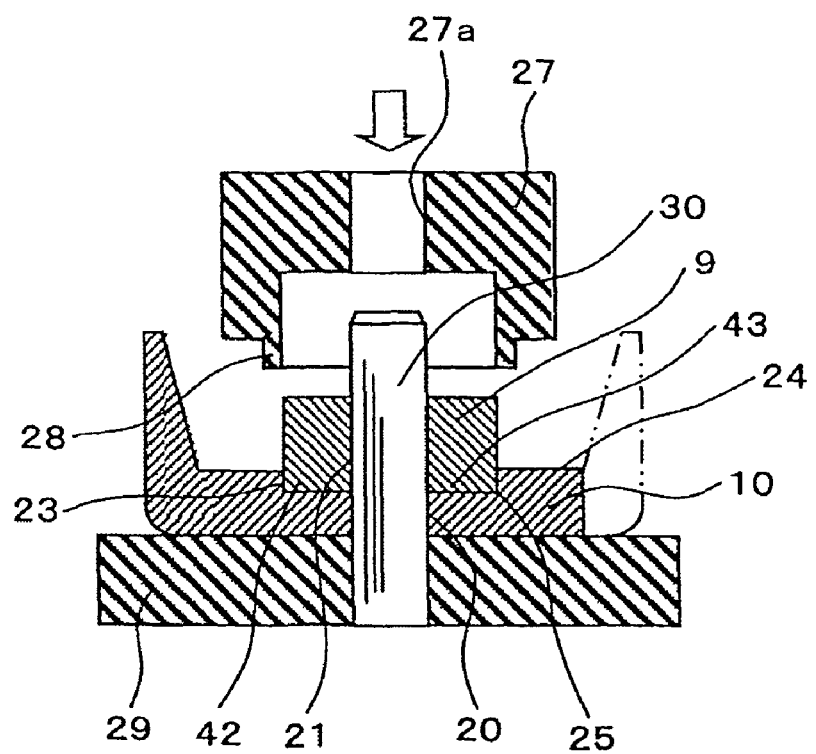
FIG. 7 is a longitudinal sectional view showing a state where the claw-equipped core and the yoke are set on a die in a plastic-flow joining process according to the present invention.

A plastically joining process will be described below with reference to FIGS. 7, 8 and 9. As shown in FIG. 7, the core central hole 20 formed in the claw-equipped core 10 is inserted through a column-like mandrel 30 fixed on a plate 29 such that the claw-equipped core 10 is held in an illustrated state. Thereafter, an end 42 of the yoke 9 on the side where the annular grooves 40 are formed is fitted to the joining hole 23 of the claw-equipped core 10. Portions of the claw-equipped core 10 and the yoke 9 fitted to each other are desirably dimensioned to allow clearance fit when the end of the yoke 9 is fitted to the joining hole 23 of the claw-equipped core 10. The fitted portions of the claw-equipped core 10 and the yoke 9 are as shown in an enlarged longitudinal sectional view of FIG. 10 or 11.

Figure 8:
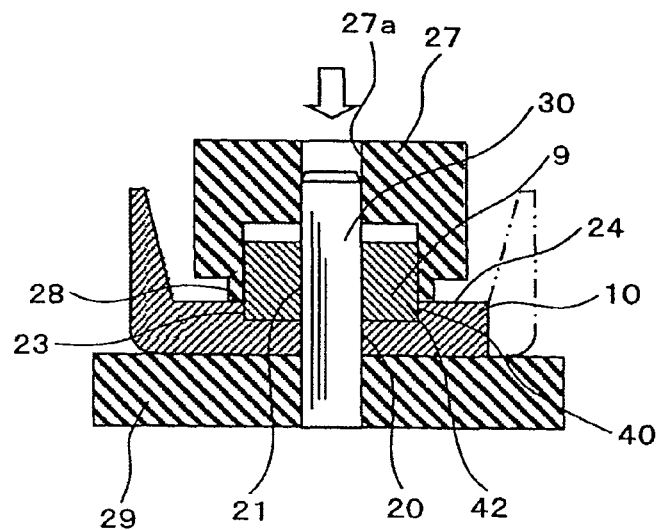
FIG. 8 is a longitudinal sectional view showing a state just before the joining between the claw-equipped core and the yoke is started in the plastic-flow joining process according to the present invention.

Subsequently, as shown in FIG. 8, a punch 27 having a mandrel insertion hole 27a formed to penetrate therethrough is fitted over the mandrel 30, thus coming into a state just before the start of pressing. Then, by pressing the punch 27 to drive it in the direction of an arrow by a press ram (not shown), an annular boss 28 of the punch 27 presses a portion of an end surface 24 of the claw-equipped core 10 which is positioned near the joining hole 23, desirably the outer peripheral edge of the joining hole 23.

Figure 9:
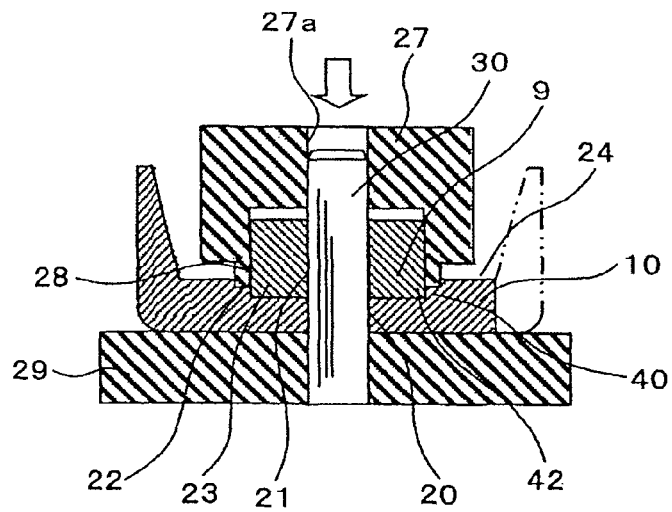
FIG. 9 is a longitudinal sectional view showing a state just after the joining between the claw-equipped core and the yoke is completed in the plastic-flow joining process according to the present invention.
Figure 10:
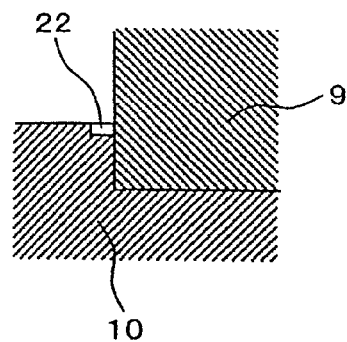
FIG. 10 is a partially enlarged longitudinal sectional view showing one example of portions of the claw-equipped core and the yoke joined to each other according to the present invention.

FIG. 9 shows a state where the pressing is completed. A pressing force of the punch 27 is set to apply a load for generating stresses sufficient to plastically deform the material of the claw-equipped core 10 so that the material near the joining hole 23 is deformed in the axial direction of the rotary shaft 5 to flow into the annular grooves 40 by plastic flow for joining the yoke 9 and the claw-equipped core 10 together. At that time, since the annular grooves 40 have the triangular cross-sections, the sloped surfaces enable the material to flow more easily by plastic flow. Therefore, compressive stresses can also be more easily generated. The fitted portions after being subjected to the plastic flow in such a manner are as shown in the enlarged longitudinal sectional view of FIG. 11. Alternatively, as shown in FIG. 10, the annular grooves 40 are not necessarily required to be formed in the yoke 9 and a part of the claw-equipped core 10 may be pressed and joined to an outer periphery of the yoke 9 just by plastic flow.

When the material near the joining hole 23 is deformed to flow into the annular grooves 40 by plastic flow, resulting pressure is transmitted in the axial direction, whereby an end surface 43 of the yoke 9 is joined to the bottom surface 25 of the joining hole 23 of the claw-equipped core 10 in close contact relation by that joining pressure. Therefore, the joining is completed in such a state that the end surface 43 of the yoke 9 and the bottom surface 25 of the joining hole 23 of the claw-equipped core 10 are closely contacted with each other while adhesion stresses are held and enclosed between them. As a result, magnetic characteristics are improved, an output is increased, and magnetic noise is reduced.

Figure 17:
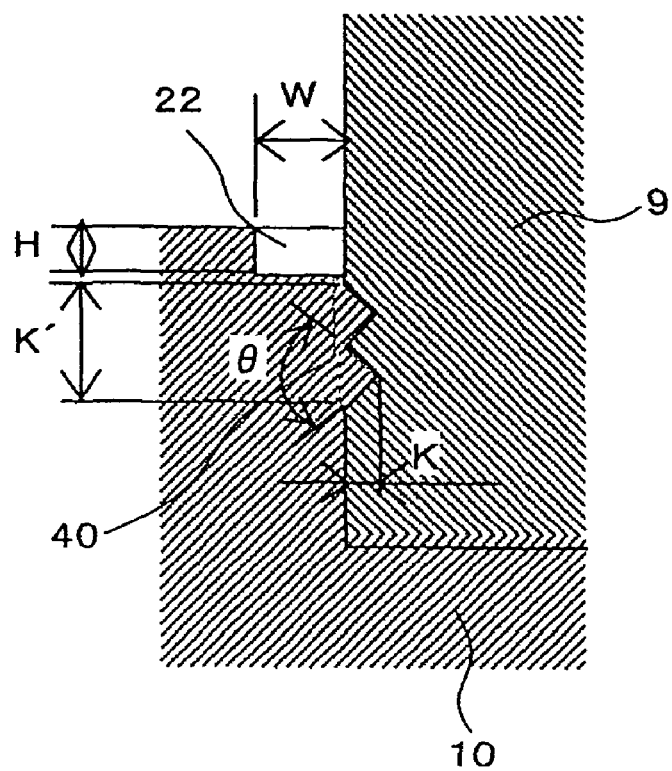
FIG. 17 is a partially enlarged longitudinal sectional view showing dimensions of the portions of the claw-equipped core and the yoke joined to each other according to the present invention.

Further, a boss width W of the annular boss 28 of the punch 27 and a pressing depth H, shown in FIG. 17, are desirably set in conformity with the shape of the annular grooves 40 for the reason as follows. If the boss width W and the pressing depth H are too large, the material is caused to flow in amount in excess of the amount allowable to flow into the annular grooves 40 and the claw-equipped core 10 is deformed, thus resulting in deterioration of joining accuracy. The joining strength is increased with an increase in a depth K of the annular grooves 40. However, if the depth K of the annular grooves 40 is too large, the strength of the claw-equipped core 10 itself is reduced because the depth of the joining hole 23 has to be increased and the thickness of the claw-equipped core 10 at the bottom of the joining hole 23 is reduced correspondingly. Also, an increase in the depth K of the annular grooves 40 requires a larger amount of plastic flow and a larger pressing force, whereby the joining accuracy is deteriorated. In this embodiment, therefore, the annular grooves 40 are shaped to have the groove depth K of about 0.3-0.5 mm, a groove angle θ of about 60°90°, and a groove width K' of about 0.6-2 mm. Further, the boss width W is set to about 0.5-1.6 mm and the pressing depth H is set to about 0.4-1 mm.

Figure 12:
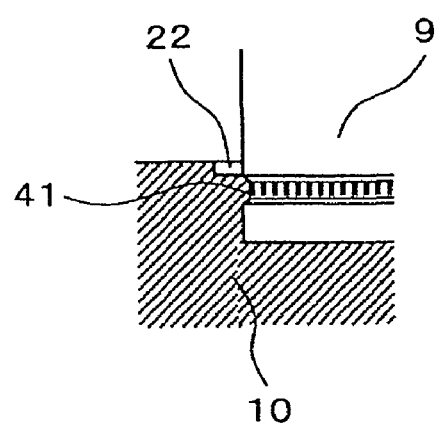
FIG. 12 is a partially enlarged longitudinal sectional view showing still another example of the portions of the claw-equipped core and the yoke joined to each other according to the present invention.
Figure 13:
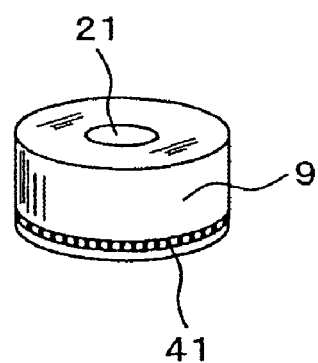
FIG. 13 is a perspective view showing one example of the yoke according to the present invention.
Figure 14:
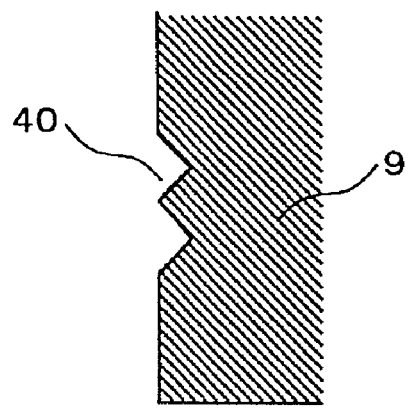
FIG. 14 is a partially enlarged longitudinal sectional view showing one example of shape of an annular groove in the yoke according to the present invention.
Figure 15:
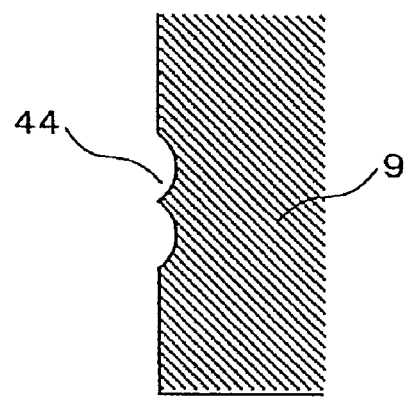
FIG. 15 is a partially enlarged longitudinal sectional view showing another example of shape of the annular groove in the yoke according to the present invention.
Figure 16:
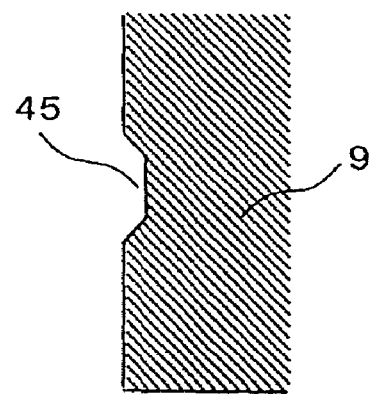
FIG. 16 is a partially enlarged longitudinal sectional view showing still another example of shape of the annular groove in the yoke according to the present invention.

The cross-sectional shape of the annular grooves 40 of the yoke 9 is not necessarily required to be triangular as shown in FIG. 14. More specifically, the annular grooves 40 can be replaced with circularly curved grooves, i.e., grooves 44 having substantially semicircular curved surfaces in an axial cross-section as shown in FIG. 15, or with a single groove 45 having a trapezoidal shape as shown in FIG. 16. The substantially semicircular grooves 44 are easier to machine it and enable the plastic flow to be more easily caused along their inner curved surfaces. The trapezoidal groove 45 is even easier to machine it and is suitable for manufacturing a product at an inexpensive cost. Because the groove depth cannot be so increased when the annular groove is formed to have a substantially semicircular cross-section, the substantially semicircular groove is suitably used for a yoke having a relatively large diameter. The number of the annular grooves is not limited to a particular number and it may be one or plural. When a plurality of annular grooves are formed, the grooves may be spaced from each other by a certain distance or may be formed in a spiral shape. Further, by machining the annular grooves by cold rolling, the strength of groove portions is increased by work hardening and a degree of deformation caused during the joining process is reduced, thus resulting in higher joining strength. In particular, when the groove inner surface is formed to have a roughly projected and recessed shape by knurling as shown in FIGS. 12 and 13, a larger degree of the rolling work is obtained so as to provide higher work hardening. Thus, the knurling of the groove inner surface is effective in increasing the groove strength and the joining strength. Moreover, by making the claw-equipped core 10 softer than the yoke 9 with annealing, for example, since a hardness difference between the claw-equipped core 10 and the yoke 9 is increased, it is possible to reduce the amount of deformation of the annular grooves 40 of the yoke 9 in the plastic-flow joining process, and to increase the joining strength.

After the completion of the plastic-flow joining process as shown in FIG. 9, the press ram (not shown) is ascended to move the punch 27 away from the yoke 9, and the rotor core 11 including the yoke 9 and the claw-equipped core 10 integrally joined to each other is removed from the plate 29 and the mandrel 30. The rotor core 11 is thereby completed.

Because the claw-equipped core 10 and the yoke 9 are integrally joined to each other in coaxial relation with the aid of the mandrel 30, they have superior coaxial accuracy. Therefore, when the thus-obtained rotor core 11 is fastened to the rotary shaft 5, balance required as a rotating member can be easily established.

Figure 18:
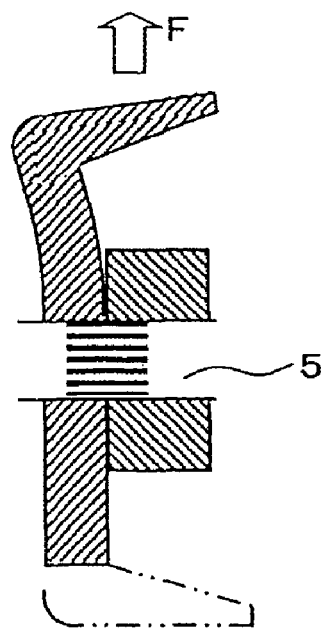
FIG. 18 is a partial longitudinal sectional view showing elastic deformation caused by a centrifugal force in a state where a yoke and a core are fastened to a rotary shaft in the related art.
Figure 19:
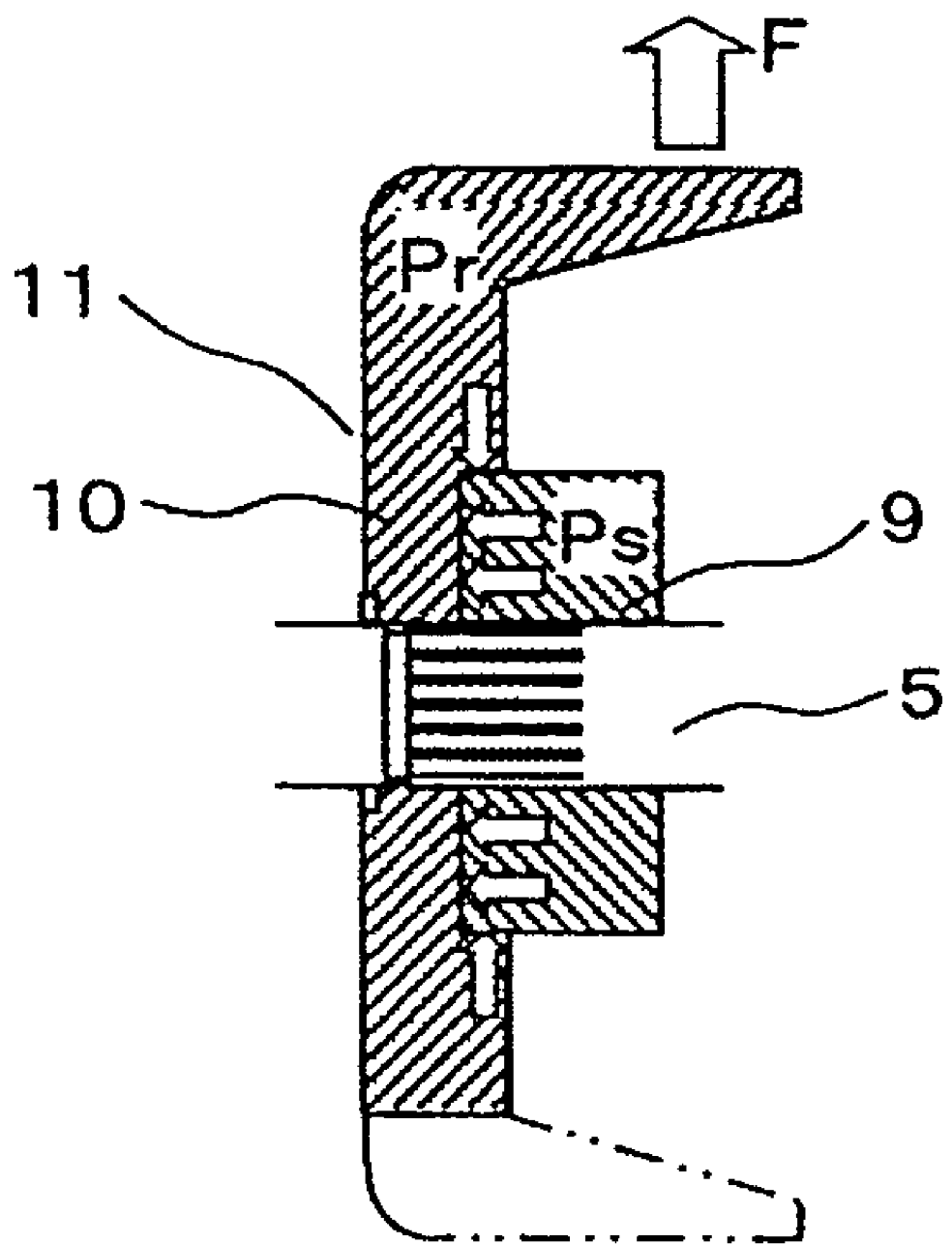
FIG. 19 is a partial longitudinal sectional view showing elastic deformation caused by a centrifugal force in a state where the rotor core according to the present invention is fastened to a rotary shaft.

When the rotor core 11 is subjected to a centrifugal force with high-speed rotation of the rotary shaft 5, the claw-equipped core and the yoke tend to separate at their contact surfaces by the action of a centrifugal force F, as shown in FIG. 18, if they are not joined to each other by plastic flow. On the other hand, in the case of the rotor core 11 in which the claw-equipped core 10 and the yoke 9 are joined to each other by plastic flow as in this embodiment, the contact surfaces of the claw-equipped core 10 and the yoke 9 are hard to separate from each other even under the action of the centrifugal force F because, as shown in FIG. 19, radial compressive stresses Pr are generated along the entire circumference of the claw-equipped forces between the claw-equipped core 10 and the yoke 9 are held therein as residue stresses by the presence of axial stresses Ps.

Further, with the annular grooves 40 formed in the yoke 9, the material caused to flow into the annular grooves 40 by plastic flow develops the so-called spike effect which makes the contact surfaces of the claw-equipped core 10 and the yoke 9 harder to separate from each other. When the annular grooves 40 have the knurled inner surfaces, the resistance against forces in the rotating direction as well can be further increased.

Because the rotor cores 11 and 14 are used in pair and have basically the same structure, the rotor core 14 is manufactured in the same manner as the rotor core 11. The rotor cores 11 and 14 are fixed to knurled annular grooves formed in the rotary shaft 5 by a similar method to the above-described method used for joining the yokes 9, 12 and the claw-equipped cores 10, 13 such that the yokes 9 and 12 are contacted with each other and the rotor cores 11 and 14 are held fixed in both the axial direction and the rotating direction by plastic flow.

The claw-equipped core 10 and the yoke 9 can be manufactured respectively at inexpensive costs, for example, by cold-forging of a blank which is obtained by punching a low-carbon steel plate into a starfish-like shape, and by cold-forging of a round rod under compression. As an alternative, the claw-equipped core 10 and the yoke 9 may be manufactured by cutting.

The advantages of this embodiment will be described below.

The rotor cores 11 and 14 are obtained by manufacturing the yokes 9, 12 and the claw-equipped cores 10, 13 as separate members, and joining the paired members to each other by plastic flow. In comparison with the case where the yoke and the claw-equipped core are integrally formed as one component, therefore, the scale of a production facility including a cold-forging pressing step, an intermediate annealing step, a lubricating step, etc. is not so increased and the rotor core can be inexpensively produced in a relatively small-scaled facility. Hot forging is also usable instead of cold forging, but the hot forging is disadvantageous in deteriorating accuracy, requiring more complicated steps because of the necessity of ensuring accuracy in shape by additional cutting or cold forging, and contradicting with the aspect of energy saving. Therefore, the cold forging is more desirable than the hot forging.

Since the rotor cores 11 and 14 are obtained by joining the yokes 9 and 12 and the claw-equipped cores 10 and 13 to each other by plastic flow, respectively, the yokes 9 and 12 and the claw-equipped cores 10 and 13 can be positively avoided from separating from each other at their joined portions under influences of centrifugal forces acting on the claw-equipped cores 10 and 13 even when the rotor cores 11 and 14 are rotated at high speed with the rotation of the engine. Accordingly, it is possible to prevent an increase of magnetic resistance and deterioration of magnetic performance.

Figure 20:
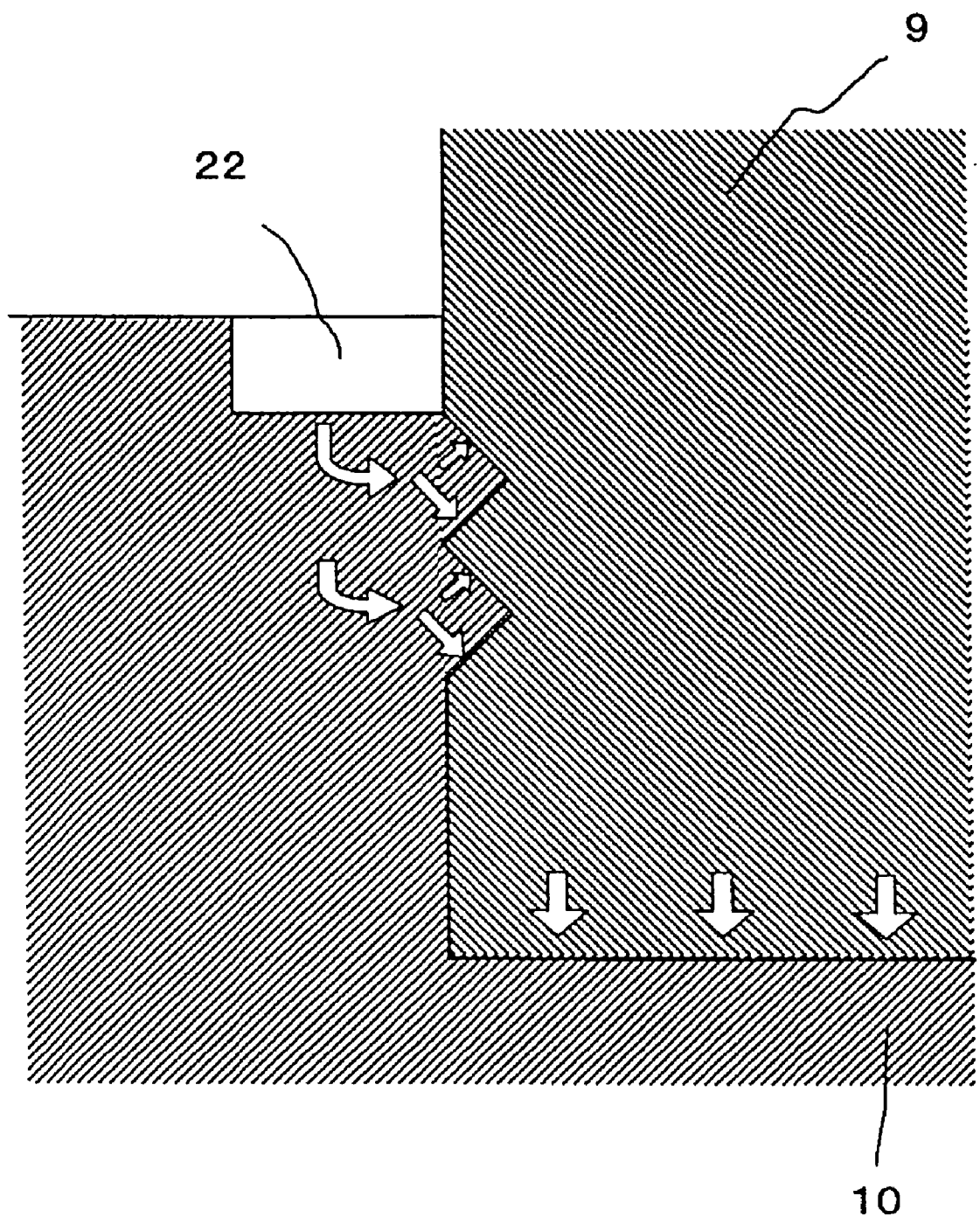
FIG. 20 is a partially enlarged longitudinal sectional view showing how stresses act in the present invention.

Since the yoke 9 and the claw-equipped core 10 are joined to each other by plastic deformation, the material of the claw-equipped core 10 is caused to flow radially inward toward the yoke 9 as indicated by arrows in FIG. 20, and the yoke 9 and the claw-equipped core 10 can be joined to each other in a state where radial compressive stresses are held therein. Also, since the material of the claw-equipped core 10 subjected to the plastic flow is more apt to flow in the axial direction, component forces acting from the annular grooves 40 toward the bottom surface 25 of the joining hole 23 become larger, whereby stresses acting to closely contact the yoke 9 and the claw-equipped core 10 with each other in the axial direction can also be held therein. Even with the centrifugal force acting on the claw-equipped core 10, therefore, the yoke 9 and the claw-equipped core 10 can be maintained in a closely contacted state, and a gap between the claw-equipped core 10 and the stator core 3 can be set to a minimum value so that they are positioned as close as possible. As a result, magnetic characteristics are improved, an output is increased, and magnetic noise is reduced. In particular, by forming the bottom-equipped joining hole 23 in the claw-equipped core 10, fitting the end of the yoke 9 to the joining hole 23, and then causing a part of the claw-equipped core 10 to deform by plastic flow, the yoke 9 and the claw-equipped core 10 can be joined to each other in a state where larger axial compressive stresses act between the bottom surface of the joining hole 23 and the end of the yoke 9.

Further, since the annular grooves 40 are formed in the outer periphery of the yoke 9 near its one end, the material of the claw-equipped core 10 is caused to fill into the annular grooves 40 when the claw-equipped core 10 is subjected to plastic flow. Thus, the material of the claw-equipped core 10 is not just pressed against the yoke 9, but it is caused to bite into the yoke 9, whereby the yoke 9 and the claw-equipped core 10 can be joined to each other with higher reliability. Moreover, since the annular grooves 40 are knurled by cold forging, a portion around the annular grooves 40 is hardened so that the material of the claw-equipped core 10 can more easily bite into the yoke 9. In addition, by annealing the claw-equipped core 10 to make it softer, the material of the claw-equipped core 10 is able to more easily bite into the yoke 9.

While the present invention has been described above in connection with one embodiment, the number of the claws of the claw-equipped core 10 may be eight instead of six. Namely, the number and the shape of the claws is a matter of choice in design. When the number of the claws is increased, the number of magnetic flux paths is also increased and the efficiency of power generation is improved correspondingly. On the other hand, the strength of each claw is reduced. Therefore, the number of the claws is required to be set to an appropriate number.

While the embodiment has been described above in connection with the rotor core of the alternator, similar advantages to those of the above-described embodiment can also be obtained so long as the rotor core is a rotatable member regardless of the type of rotating electrical machine.

While the yokes 9 and 12 are each formed into a cylindrical shape in the above-described embodiment, the yoke is not always required to have a cylindrical shape so long as it is tubular. Depending on applications, each yoke can be formed into a polygonal shape, a partly cutout shape, or any other suitable shape.

While the fitting portion is constituted by the joining hole 23 formed in the claw-equipped core 10 in the above-described embodiment, plastic flow may be performed in such a state that a joining hole is formed in the yoke 9 and a projection formed on the claw-equipped core 10 is fitted to the joining hole of the yoke. Also, the joining hole 23 is not always required to be a recess directly formed in the claw-equipped core 10 or the yoke 9. For example, the joining hole 23 may be given as a recess formed by raising a portion around the joining hole 23.

While the pressing mark 22 is formed in the outer peripheral edge of the joining hole 23 in the above-described embodiment, the pressing mark 22 is not always required to be positioned just at the edge of the joining hole 23 and it may be formed at a certain distance away from the edge the joining hole 23. When a portion around the joining hole 23 is in the protruded form, the pressing mark 22 may be positioned in a side surface of the protruded portion around the joining hole 23.

While the pressing mark 22 is formed in an annular shape in the above-described embodiment, the pressing mark is not always required to have an annular shape and it may be formed at plural positions in the circumferential direction. When the pressing mark is formed at plural positions, those marks are preferably positioned at equal intervals in the circumferential direction.

While the embodiment has been described above as forming, in the yoke 9, the annular groove 40 into which is caused the material to flow by plastic flow, the groove is not always required to have an annular shape and it may be formed at plural positions in the circumferential direction. When the groove is formed in plural positions, those grooves are preferably positioned at equal intervals in the circumferential direction. Further, when the material of the yoke 9 is caused to flow by plastic flow, the groove can be formed in the claw-equipped core 10.

While the embodiment has been described above as knurling the inner surface of the annular groove 40, similar advantages to those of the above-described embodiment can also be obtained if certain irregularities including projections and recesses are present within the groove.

While the annular groove 40 is subjected to cold rolling for work hardening in the above-described embodiment, any other suitable method can also be used so long as the method is able to harden the material forming the annular groove. For example, cutting can be used instead.

While the claw-equipped core 10 is subjected to annealing to make the claw-equipped core 10 softer than the yoke 9 in the above-described embodiment, the yoke is required to be annealed in the case of causing the material of the yoke to flow by plastic flow. As an alternative method of providing a difference in hardness between the claw-equipped core 10 and the yoke 9, it is also conceivable to change their materials.

While plastic flow is employed in the above-described embodiment as means for mechanically integrating the claw-equipped core 10 and the yoke 9, they may be mechanically integrated with each other by any other suitable means, such as friction welding.

While the joining hole 23 is formed as a hole in the form of a recess equipped with the bottom in the above-described embodiment, the joining hole may be formed, for example, as a hole penetrating through the claw-equipped core 10 at the same diameter as that of a base portion of the yoke 9.

Other embodiments derived from the above-described embodiment and not set forth in claims will be described below along advantages thereof.

(1) An alternator featured in including two rotor cores in each of which a claw-equipped core having claws projecting in the axial direction and a yoke disposed on the inner peripheral side of the claws in contact with an axially-face side surface of the claw-equipped core are mechanically integrally joined to each other, wherein the two rotor cores are fixed to a rotary shaft such that end surfaces of the yokes are held in a mutually abutted state while allowing a field coil to be disposed between inner peripheries of the claws and outer peripheries of the yokes.

(2) A rotor core of an alternator, which is featured in that the claw-equipped core having the claws projecting in the axial direction and the yoke disposed on the inner peripheral side of the claws in contact with the axially-faced side surface of the claw-equipped core are joined to each other while residue stresses in both the radial direction and the axial direction are held therein. With that feature, contact surfaces of the claw-equipped core and the yoke are harder to separate from each other even when a large centrifugal force acts on them during high-speed rotation.

(3) A rotor core of an alternator, which is featured in that the claw-equipped core having the claws projecting in the axial direction and the yoke disposed on the inner peripheral side of the claws in contact with the axially-faced side surface of the claw-equipped core are integrally joined to each other, and a hardened portion is formed near the interface between the claw-equipped core and the yoke to have larger hardness than other portion. With that feature, since the strength in the portion near the interface between the claw-equipped core and the yoke is increased, the claw-equipped core and the yoke can be prevented from separating from each other at a minimum possibility even when a large centrifugal force acts on them during high-speed rotation.

(4) The rotating electrical machine described in (3), which is featured in that the hardened portion is formed in an annular shape. With that feature, since the strength in the portion near the interface between the claw-equipped core and the yoke is increased in an annular area, the claw-equipped core and the yoke can be prevented from separating from each other with higher reliability.

(5) A method of manufacturing a rotor core of an alternator including two rotor cores each of which is made up of a claw-equipped core having claws projecting in the axial direction and a yoke disposed on the inner peripheral side of the claws in contact with an axially-faced side surface of the claw-equipped core, wherein each of the rotor cores is manufactured through the steps of forming a fitting portion in the claw-equipped core, fitting the yoke to the fitting portion, and axially pressing a part of the claw-equipped core around the fitting portion to be plastically deformed, thereby joining the claw-equipped core and the yoke to each other, and wherein the two rotor cores are fixed to a rotary shaft such that end surfaces of the yokes are held in a mutually abutted state while allowing a field coil to be disposed between inner peripheries of the claws and outer peripheries of the yokes.

What is claimed is:

1. A rotating electrical machine comprising:
    a rotor core made up of a claw-equipped core having claws projecting in the axial direction and a tubular yoke disposed on the inner peripheral side of said claws in contact with an axially-faced side surface of said claw-equipped core;
    a field coil disposed around said yoke
    a stator core disposed with a gap left relative to said claw-equipped core; and
    a groove provided in one of said claw-equipped core and said yoke, wherein
    said yoke is joined to said claw-equipped core by plastic flow into the groove provided in one of said claw equipped core and said yoke; and
    a pressing mark generated in joining the yoke to the claw-equipped core by plastic flow is formed in said claw-equipped core,
    wherein said yoke is joined to said claw-equipped core joined within a joining hole in said claw equipped core that does not extend entirely through the claw-equipped core along said axially-faced side surface.

2. An alternator comprising:
    a rotor core made up of a claw-equipped core having claws projecting in the axial direction and a tubular yoke disposed on the inner peripheral side of said claws in contact with an axially-faced side surface of said claw-equipped core;
    a rotary shaft for applying torque to said rotor core;
    a field coil disposed around said yoke;
    a stator core disposed with a gap left relative to said claw-equipped core; and
    a stator coil disposed on said stator core, wherein said rotor core is fixed to said rotary shaft in a state where said yoke disposed on the inner peripheral side of said claws in contact with the axially-faced side surface of said claw-equipped core is integrally jointed to said claw-equipped core;
    a groove provided in one of said claw-equipped core and said yoke, wherein said yoke is joined to said claw-equipped core by plastic flow into the groove provided in the one of said claw equipped core and said yoke; and a pressing mark generated in joining the yoke to the claw-equipped core by plastic flow is formed in said claw-equipped core, wherein said yoke is joined to said claw-equipped core joined within a joining hole in said claw equipped core that does not extend entirely through the claw-equipped core along said axially-faced side surface.

* * * * *